Nov. 13, 1923.                                                      1,474,119
C. ROBERTSON
MITER CLAMP
Filed March 1, 1923                         2 Sheets-Sheet 1
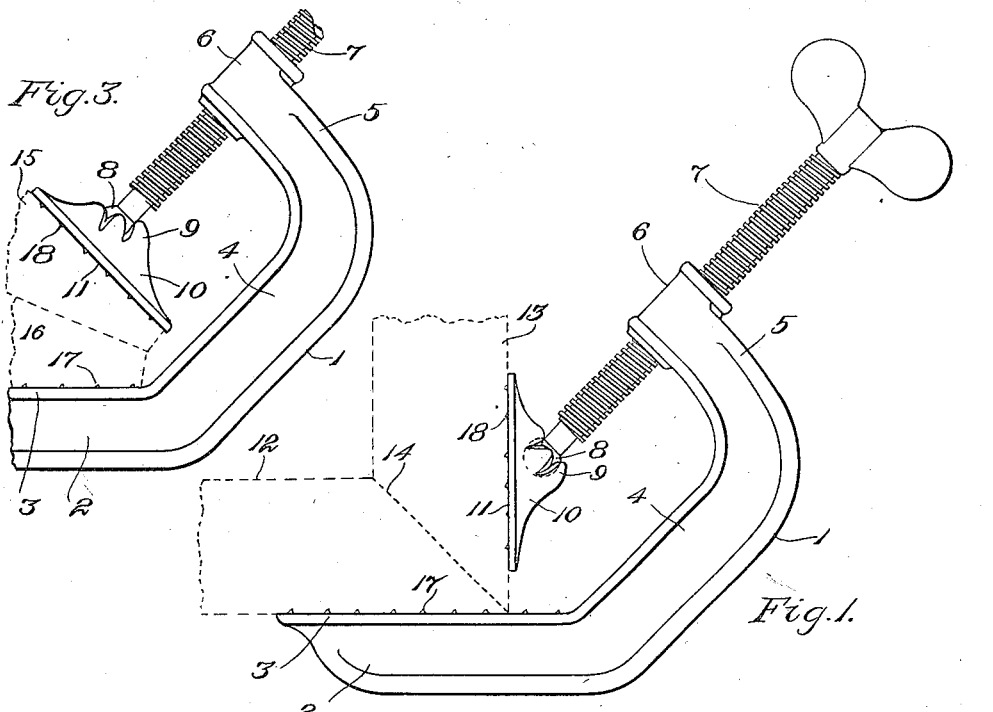
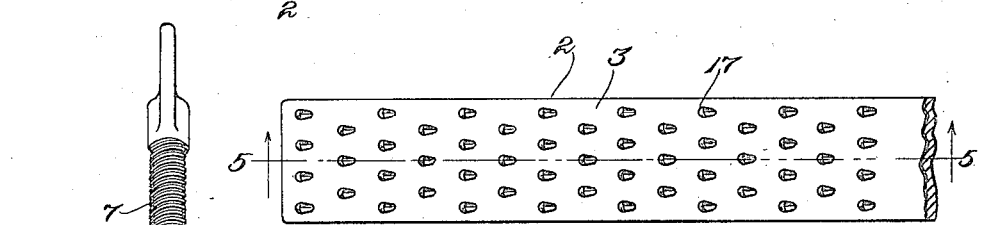
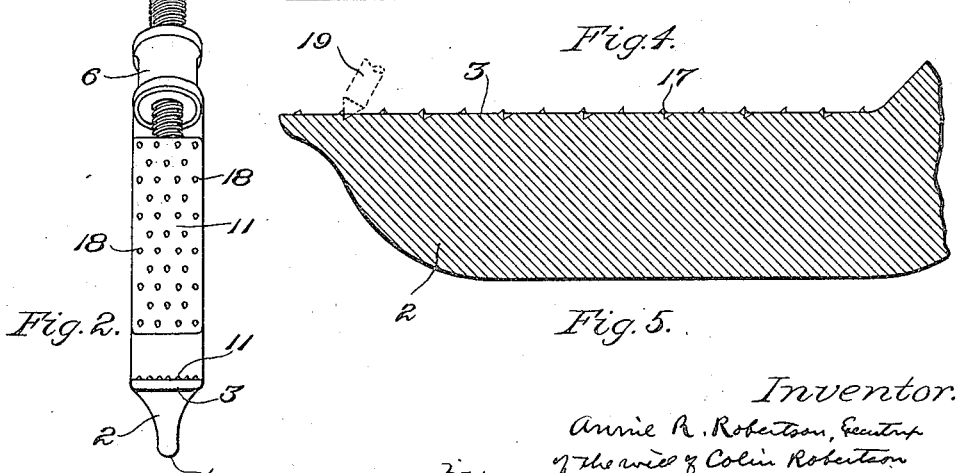
Inventor:
Annie R. Robertson, Executrix
of the will of Colin Robertson
by Macleod, Calver, Copeland & Dike
Attorneys.

Nov. 13, 1923.

C. ROBERTSON

MITER CLAMP

Filed March 1, 1923

Inventor:
Annie R. Robertson, Executrix
of the will of Colin Robertson
By Macleod, Calver, Copeland & Dike
Attorneys.

Patented Nov. 13, 1923.

1,474,119

UNITED STATES PATENT OFFICE.

COLIN ROBERTSON, DECEASED, LATE OF ANTRIM, NEW HAMPSHIRE; BY ANNIE R. ROBERTSON, EXECUTRIX, OF ANTRIM, NEW HAMPSHIRE, ASSIGNOR TO WILLIAM H. BANKS, OF WINTHROP, MASSACHUSETTS.

MITER CLAMP.

Application filed March 1, 1923. Serial No. 622,139.

*To all whom it may concern:*

Be it known that COLIN ROBERTSON, deceased, late of Antrim, county of Hillsborough, State of New Hampshire, invented a certain new and useful Improvement in Miter Clamps, of which the following is a specification, reference being had therein to the accompanying drawings.

This invention relates to a new and useful improvement in bevel clamps. One object of the invention is to provide a bevel clamp of simple form of construction which is adapted for use not only in connection with a device for clamping together two members which form a miter joint strictly speaking, that is, in which two members are to be joined together which stand at an angle of 90° to each other, each member being beveled at an angle of 45°, but the invention is also adapted for use in clamping together two members in which the angle is somewhat greater or less than 90°, the clamp being self-adjustable whatever may be the angle. Another object of the invention is to provide the clamping jaws with gripping faces so constructed as to prevent slipping on the face of the article which is being gripped. Other features of the invention will be more particularly set forth hereinafter and specifically claimed in the claim at the end of the specification.

The invention will be fully understood from the following description when taken in connection with the accompanying drawings, and the novel features thereof will be pointed out and clearly defined in the claim at the close of this specification.

In the drawings:

Fig. 1 is a side elevation of a clamp embodying the invention showing in dotted lines two members of a frame, partly broken away, which are clamped together to form a miter joint.

Fig. 2 is a front elevation of the device shown in Fig. 1, the work which is shown in dotted lines in Fig. 1 being omitted.

Fig. 3 is a fragmentary view showing a portion of the screw member of the clamp with the jaw in its normal position when not in use.

Fig. 4 is a plan on an enlarged scale, partly broken away, of the operative face of the jaw member of the clamp which is rigidly connected with the body portion.

Fig. 5 is section on line 5—5 of Fig. 4.

Figure 6:
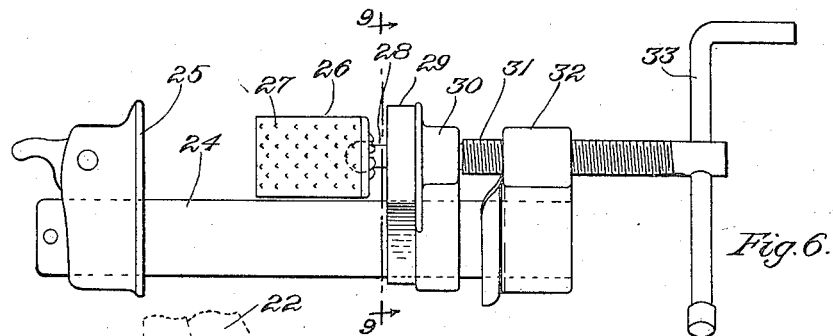
Fig. 6 is a side elevation of modified form of construction showing the invention as applied to the movable jaw of a single-bar clamp.

Referring now to the drawings; there is represented at 1, what for convenience may be termed the head or frame member of the clamp, said member 1 having at one extremity an arm 2 provided with a clamping jaw 3 rigidly connected to or integral with said arm 2. Said arm 2 extends at an angle to the intermediate portion 4 of the member 1. The said intermediate member 4 terminates at the other extremity in an arm 5. The arm 5 terminates in a boss 6 which is tapped out to receive the screw 7 which forms a part of the second member of the clamp. The inner end of said screw 7 has a flexible connection, preferably by a ball and socket joint, with the jaw 10 as represented by the ball 8 and socket 9. The jaw 10 has a clamping face 11. As represented in Fig. 1, the two clamping faces 3 and 11 are shown adjusted at right angles to each other and engaging the outer side edges of two members 12 and 13, respectively, which are to be joined together, each of which is beveled off at an angle of 45° to form a miter joint 14.

It is obvious that while, as shown in Fig. 1, the clamp is arranged as a miter clamp it is adapted to be used when the two members to be clamped together are arranged at an angle to each other either somewhat greater or less than 90°. In Fig. 3 the device is shown as clamping together two frame members 15 and 16 which are arranged to an acute angle to each other, the end of each frame member being beveled off at an angle less than 45°. It is obvious that the device is adapted for clamping together the two parts at such an angle.

One of the important features of the invention consists in providing the gripping surfaces of the jaws with means to prevent slipping of the clamped members while the clamp is being applied. This feature consists in forming the clamping face of each jaw with teeth or prick points 17 and 18. These prick points are beveled on their back sides and the front sides are either perpendicular to the face or are inclined in a direction to point toward the beveled ends of the members which are to be clamped together, for instance, the fixed jaw 17 is formed with points or teeth whose rear sides are beveled backwardly toward the outer end of the jaw and whose front sides are either perpendicular to the face or are inclined toward the arm 4 of the body member and the points 18 of the bevel jaw 10 are similarly formed with beveled backs as viewed in Fig. 1. It will be evident that when the two beveled ends of the members 12, 13 are placed together, as shown in Fig. 1, the lower edge of the member 12 resting on the jaw 3 and the screw 7 is set up so as to bring the face of the jaw 10 against the edge of the member 13 and the screw 7 is then tightened up, the points 18 of the jaw 10 will dig into the edge of the frame 13 and the pressure of the screw will tend to force the frame member 13 downward as well as outward and press its beveled edge into tighter contact with the beveled edge of the member 12, and the teeth 17 of the lower jaw will bite into the edge of the frame member 12 and prevent its slipping backward under the downward pressure exerted by the screw. If the faces of the two jaws were smooth then the downward pressure exerted by setting up the screw would tend to force the member 12 backwards but by reason of the construction shown if the two members 12, 13 are correctly positioned before the screw is set up, so that the corner of the frame member 13 is in exact registration with the corner of the frame member 12, there will be absolutely no slipping of the two frame members with relation to each other.

The preferred method of forming the points or teeth 17 and 18 is by means of a steel punch 19 having a conical pointed end with the jaws being made of malleable iron or soft steel so that the teeth or points of the jaws may be made by setting the punch against the jaw at an angle shown in Fig. 5 and strike a blow on the head of the punch. The punch can be inclined in any angle desired so as to give the proper backward inclination to the teeth or points 17 and 18.

The teeth made in this way afford sufficient bite for the purpose required without doing injury to the parts which are to be joined together. The teeth, however, may be formed in any other suitable manner. It is preferable to have the teeth well distributed over the surface of the jaw for the full width of the jaw.

Figure 7:
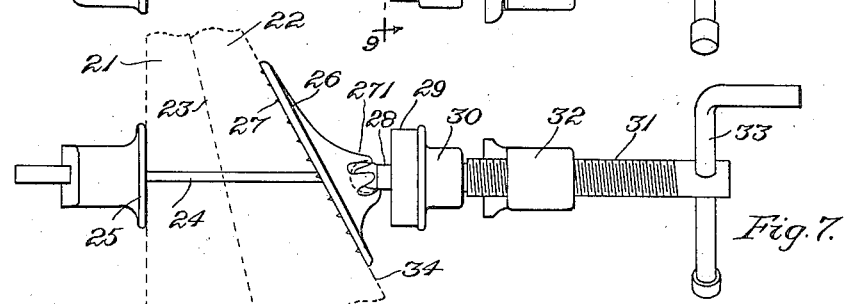
Fig. 7 is a plan view of the device shown in Fig. 6.

In the modification shown in Figs. 6 and 7 in which the invention is applied to a single-bar clamp, this is more particularly intended for clamping together boards of non-parallel sides such, for instance, as represented at 21 and 22 which are to be glued together at their abutting edges as along the line 23. It is especially useful in building winding stairs. In this construction the bar, as represented at 24 has the foot piece 25 which serves as the stationary jaw of the clamp. The movable jaw is represented at 26 and embodies the invention already shown and described with reference to the movable jaw 10, that is, it has the points 27 formed on its gripping face which are inclined as already described. It has a ball and socket connection at 27 with a stem 28 projecting from a block 29 slidably mounted on the bar 24. Preferably said block 29 is formed with a groove in its lower edge which fits over the bar 24 and is adapted to slide thereon. Preferably the block is removable from the bar together with the jaw member 26 so that, if desired, it can be replaced by another.

The slide block 29 to which the movable jaw 26 is connected is positioned to straddle the bar 28 directly in front of the slide member 30 also mounted on said bar and with which the forward end of the said screw 31 has a loose connection. Said feed screw passes through a tapped-out hole in a head 32 rigidly connected with the said bar 24 in the opposite end from the stationary clamp 25. Said screw is provided with a handle 33 by which the screw is rotated in a well known manner.

When the two boards 21, 22 are placed together, as shown in Fig. 7, so that the line 23 of the abutting edges is inclined to the axis of the bar 24 and inclined to the plane of the face of the fixed jaw 25, the gripping face of the jaw 26 will automatically adjust itself to engage the edge 34 of the board 22 and the points 27 will bite into the edge of the board pointing downwardly as viewed in Fig. 7. When the screw is set up to draw the movable jaw towards the fixed jaw, the tendency of the inclined face of the movable jaw will be to force the board 22 downward as viewed in Fig. 7 but on account of the inclined abutting edge of the board 21 there is formed a wedge action which prevents either of said boards 21, 22 from sliding down and the teeth 27 prevent sliding up so that the more the screw is set up the more tightly will the two boards be wedged together. It is not necessary, however, to set the screw up very tight, the main object of the device being to hold the two boards securely together in properly adjusted position while the glue is setting after they have been glued.

Figure 8:
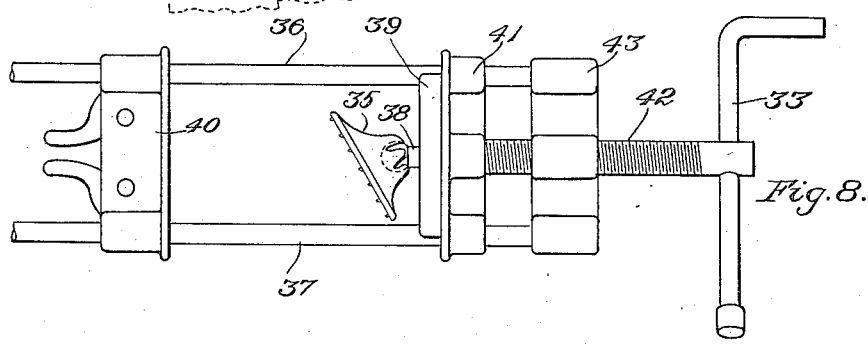
Fig. 8 is a side elevation showing a jaw embodying the invention as applied to a two-bar clamp.
Figure 9:
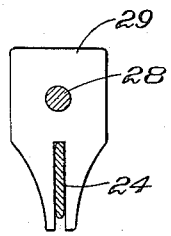
Fig. 9 is a section on line 9—9 of Fig. 6.

In the modification shown in Fig. 8, the invention is shown as embodied in a movable jaw for a two-bar clamp. The construction of the jaw 35 is substantially the same as the construction of the movable jaw shown in Figs. 6 and 7. In this form of construction there are two parallel bars 36 and 37 and the jaw 35 is connected by a ball and socket joint with a stem 38 of a block 39 which is grooved at each end to fit the bars 36, 37 and is slidable thereon toward and from the stationary jaw 40. There is also mounted on the bars 36, 37 a movable member 41 which is actuated by a screw 42 which has threaded engagement with a head member 43 rigidly connected with the two bars 36, 37.

What I claim is:

A miter clamp comprising a frame member having an arm provided with a face which constitutes a fixed jaw member, and having another arm formed with a tapped-out aperture whose axis is at an angle to the plane of the operative face of said fixed jaw, a feed screw having working engagement with said tapped-out aperture and having an axial movement in a line at an acute angle to the operative face of said fixed jaw, a jaw mounted on the inner end of said feed screw and having a swivel joint connection therewith, said movable jaw being automatically adjustable by reason of its swivel connection with the feed screw in such manner as to vary the angle of the operative face of said jaw with relation to the operative face of the fixed jaw, according to the angle of the two faces of the work which are respectively engaged by said jaws when in clamping engagement therewith.

In testimony whereof I affix my signature.

ANNIE R. ROBERTSON,
*Executrix of the will of Colin Robertson, deceased.*